(No Model.) 2 Sheets—Sheet 1.
H. F. EATON.
ELECTRIC SIGNAL SYSTEM.
No. 468,107. Patented Feb. 2, 1892.
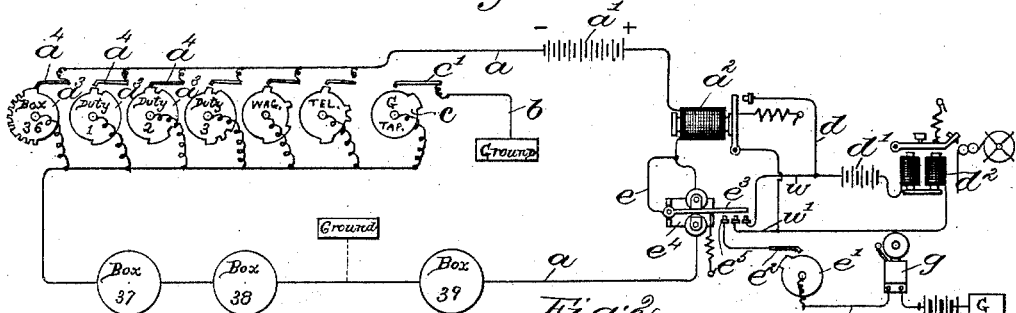
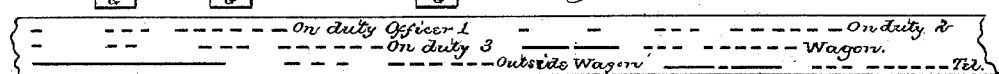
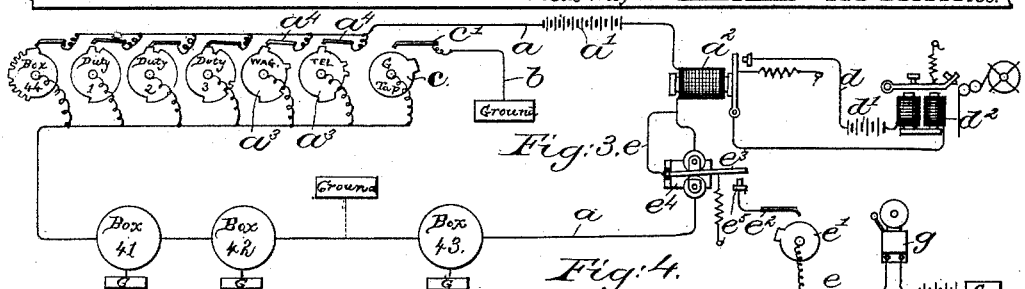
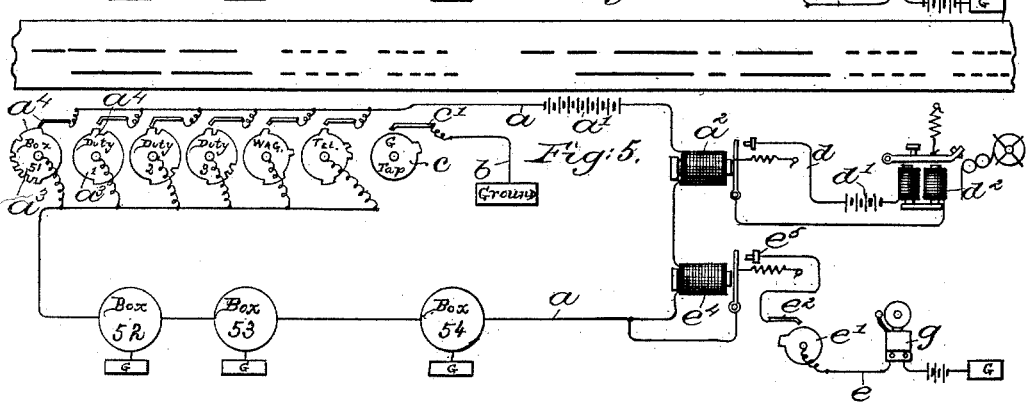
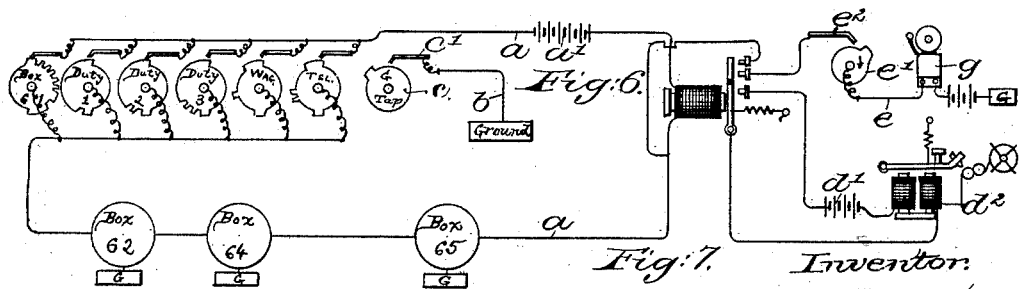
Witnesses: Inventor:
Fred S. Greenleaf Howard F. Eaton
Edward F. Allen by Crosby & Gregory
 Attys.

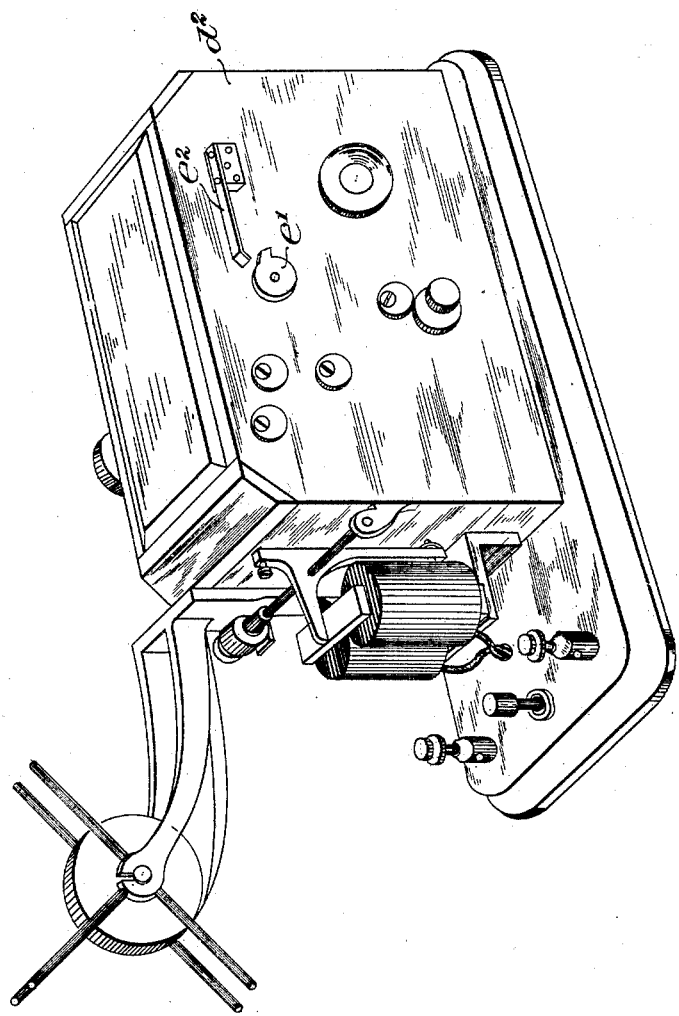

UNITED STATES PATENT OFFICE.

HOWARD F. EATON, OF QUINCY, MASSACHUSETTS.

ELECTRIC SIGNAL SYSTEM.

SPECIFICATION forming part of Letters Patent No. 468,107, dated February 2, 1892.

Application filed March 16, 1891. Serial No. 385,206. (No model.)

*To all whom it may concern:*

Be it known that I, HOWARD F. EATON, of Quincy, county of Norfolk, State of Massachusetts, have invented an Improvement in Electric Signal Systems, of which the following description, in connection with the accompanying drawings, is a specification, like letters on the drawings representing like parts.

In United States Letters Patent No. 359,686, granted to B. J. Noyes, an electric signal system or apparatus is shown comprising signal-boxes containing multiple-signal transmitters and a signal-receiver connected by a main electric circuit, a normally-open ground tap or branch at the box and a switch by which it may be closed at will, and a ground branch wire at the receiving-station, which includes a bell or other indicating-signal adapted to respond when the ground-circuit is established. Instead of having the ground branch wire normally closed at the receiving-station, as shown in said patent, the said branch wire has been left normally open and a suitable switch provided for closing it at regular or predetermined intervals of time. This system of electric signaling is especially adapted for police-signal purposes, where many of the signals transmitted are merely patrol or "on-duty" calls and a few are "special calls," which demand immediate attention. This system, however, with its necessary ground branch wires, is decidedly impracticable, because of the many accidental grounds which occur on the line and which cause the bell to ring either as soon as such accidental ground occurs or in conjunction with the first signal transmitted, so that if the line is grounded accidentally at one point the system is inoperative and incapable of accomplishing the results desired.

This invention has for its object to construct and arrange an electric signal apparatus of the class above described wherein the patrol or on-duty calls are transmitted over a metallic circuit and the ground or other circuit is utilized for the want-calls or to distinguish the want-calls, whereby the occurrence of an accidental ground will not derange or render inoperative the system.

In accordance with this invention the ground-wires at the signal-boxes are normally open and adapted to be closed at will by suitable switches or circuit-changing devices, and the ground branch wire at the receiving-station is left normally open at two points and a suitable switch or circuit-changing device is provided, controlled by a motor mechanism for closing said branch wire at one point for a short interval of time at the time the said motor mechanism is released, and another switch is provided controlled by an electro-magnetic device for closing said branch wire at the other point. The said electro-magnetic device which controls one of the switches is connected with or controlled by the main or metallic circuit, and, as herein represented, will operate to close the switch on a break in said main or metallic circuit. When the ground-circuit is established by closing all the switches, a bell or other indicating-signal included therein will respond.

Figure 1 shows in diagram an electric signal system embodying this invention; Fig. 2, a portion of a strip such as may be taken from the register included in the system shown in Fig. 1; Fig. 3, a modification of the system shown in Fig. 1; Fig. 4, a strip taken from the register of the system shown in Fig. 3; Figs. 5 and 6, other modifications of the system shown in Fig. 1; Fig. 7, a detail of a strip to be referred to, and Fig. 8 a perspective view showing a register with a circuit-controller operated by it.

Referring to Fig. 1, the main or metallic circuit $a$ includes a battery $a'$, a receiving-relay $a^2$ at the receiving-station, and several signal-boxes, which contain a multiple-signal transmitter, such as represented by the signal-wheels $a^3$ and contact-pens $a^4$ and means for operating them, as represented in United States Patent No. 320,032, dated June 16, 1885. At the signal-boxes a ground branch wire $b$ is provided, which is tapped or otherwise connected to the main circuit $a$, and said branch wire $b$ is normally open and provided with a switch or other circuit-changing device for closing it, which is herein represented as a wheel $c$ and contact-pen $c'$. The wheel $c$ is placed on the shaft containing the signal-wheels $a^3$ and is arranged to co-operate with the contact-pen $c'$ and close the ground branch wire a short interval of time whenever the contact-pen $c'$ is pressed down into engagement with the wheel $c$ and the motor of the transmitter operated. At the receiving-station the armature of the receiving-relay $a^2$ is arranged to control the local circuit $d$, containing a local battery $d'$ and register $d^2$.

At the receiving-station a ground branch wire $e$ is connected with the main line $a$, which is normally open at two points, and a switch is provided for closing it for a short interval of time consisting of a wheel $e'$ and contact-pen $e^2$. The wheel $e'$ is rotated by any suitable motor mechanism—as, for instance, it may be arranged on one of the shafts of the register $d^2$, as shown in Fig. 8—and is intended to close the said branch wire $e$ at this point a short interval of time at each revolution. Another switch is provided for the branch wire $e$, the switch-arm $e^3$ of which is operated by an electro-magnetic device, (represented in Fig. 1 as a polarized magnet $e^4$,) the coils of which are included in or connected with the main circuit $a$. When the main-line circuit $a$ is opened by any one of the signal-wheels, the armature of the polarized magnet $e^4$ will retract and the switch-arm $e^3$ will close on the contact $e^5$, thereby closing the branch wire $e$ at this point.

The operation is as follows: When sending a patrol or on-duty call, if the contact-pen $a^4$ is pressed down upon the wheel marked "duty 1" and it being understood that the contact is always in engagement with the box-number wheel and the wheels revolved the strip will show, as indicated in Fig. 2, a dot followed by two groups of dots representing the box-number. If the signal-wheel marked "duty 2" is employed, the following signal on the strip shown in Fig. 2 will be registered. If the signal-wheel marked "wagon" is utilized, which, it will be understood, is a special call, the contact-pen $c'$ will be pressed into position to engage with the wheel $c$, and as the shaft revolves the circuit $a$ will first be opened by the wheel marked "wag." and the switch $e^3 e^5$ closed, and, while open, the branch wire $b$ will be closed at $c c'$, and during this time the switch $e' e^2$ will also close the branch wire $e$, owing to the synchronous movement of the wheels $c$ and $e'$, and a ground-circuit being thereby established the bell $g$ or other indicating-signal included therein will be operated.

As herein represented, during the transmission of every signal the switch $e e'$ will close the branch wire for a short time, and also the switch $e^3 e^5$ will operate; but the branch wire at the signal-box will only be closed in conjunction with the special calls, and in order to establish the ground-circuit the three switches must be closed at one time.

If the main line $a$ is grounded at any point at the time an on-duty call is being transmitted—as, for instance, as represented in dotted lines, Fig. 1, when the main circuit is opened—the register $d^2$ will be started and the switch $e^3 e^5$ closed, and immediately thereafter, owing to the formation of the signal-wheels, the main circuit $a$ will be closed and the switch $e^3 e^5$ opened. Then the switch $e' e^2$ will be closed for a short interval of time, and after the said switch $e' e^2$ has been opened the main circuit $a$ will be again opened by the signal-wheels. It will thus be seen that at every time the main circuit $a$ is opened by means of the signal-wheels to thereby close the switch $e^3 e^5$ the switch $e' e^2$ will be opened, so that a ground-circuit cannot be established should the main line be grounded.

If any accidental ground comes on the circuit $a$, as represented in Fig. 1, and the box 39 is pulled, the circuit $a$ will be opened and the switch-arm $e^3$ will retract, and also the armature of the receiving-relay $a^2$, and when the circuit $a$ is again closed the armature of the receiving-relay $a^2$ will be attracted, and so also the switch-arm $e^3$; but if the switch $e' e^2$ closes during the time the circuit $a$ is open the armature of the receiving-relay $a^2$ will be attracted by the establishment of a ground-circuit, and hence would mutilate the signal. To overcome this feature, the switch-arms $e^3$ is also arranged to close the branch wires $w w'$ of the local circuit $d'$, to thereby operate the register in case the armature of the receiving-relay $a^2$ fails to respond to the breaks in the circuit $a$. This is the result of the branch wire $e$ being tapped to the circuit $a$ at a point between the magnet $e^4$ and the relay $a^2$. The battery $a'$ in the main circuit is arranged to hold the armature of the polarized electro-magnet $e^4$ up in the position shown by full lines, Fig. 1, and the battery in the ground branch wire $e$ is of opposite polarity, so that when the armature $e^3$ is released and the ground branch wire $e$ closed by the two switches shown the battery in said branch wire will hold the armature $e^3$ against the opposite pole of the magnet and keep the switch $e^3 e^5$ closed.

If when the accidental ground, as shown, comes on the line and the box 38 is pulled or any box on that side of the said accidental ground, the armature of the relay $a^2$ will retract on the first break in the circuit and the armature of the magnet $e^4$ will also retract, and if the main circuit is open on one of the impulses of a signal and the switch $e' e^2$ closed, a ground circuit is established through the magnet $e^4$, leaving the relay $a^2$ free to respond to such impulses.

It will be seen that by the formation of the signal-wheels as shown the main circuit will never be open on "on-duty calls" during the time that the switch $e' e^2$ closes the ground branch at the receiving-station, and hence if a single accidental ground occurs on the line—such, for instance, as indicated in Fig. 1—the fact will not be known at the receiving-station and will not in any way affect the proper registration of the signal; but on special calls, when the ground-circuit is established both between the box and the receiving-station, another ground-circuit is also established and the current will take the course of least resistance through the receiving-station; but whichever course the current may take the signal would be correctly received and recorded and the bell would respond. It is understood that such accidental grounds may be detected at any time by suitable testing-switches of any usual or suitable kind.

By referring to Fig. 3 the branch wires $w$ $w'$ of the local circuit are omitted, and by such omission the armature of the relay $a^2$ will be attracted when a ground occurs on the line, and the ground branch at the receiving-station is closed to thereby establish a ground-circuit, and such attraction of the armature will be recorded.

In Fig. 5 a neutral electro-magnet is employed in lieu of the polarized electro-magnet shown in Figs. 1 and 3 with substantially the same results, and in Fig. 6 the receiving-relay is designed to accomplish its own function—viz., to operate a local circuit which effects the operation of a register and also to serve as a switch for the ground branch wire $e$, which is operated by the electro-magnetic device.

It will be seen from the foregoing that in each instance a main electric circuit is shown over which the signals are transmitted and another circuit is shown which is employed to operate a bell or other indicating-signal in conjunction with same signals and that this bell has at the central office two normally-open switches, one of which is controlled by a motor mechanism and the other by an electro-magnetic device governed by the main signaling-circuit.

I claim—

1. In an electric signal system, a series of signal-boxes and a signal-receiving instrument and a main electric circuit connecting them, ground branch wires at the boxes and switches for closing them at will, a ground branch wire at the receiving-station, and two normally-open switches for said branch wire, one of which is controlled by a motor mechanism and the other by an electro-magnetic device governed by the main circuit.

2. In an electric signal system, a series of signal-boxes containing signal-transmitters, a message-recording instrument, and a main electric circuit connecting them, circuit-changing devices at the signal-boxes, and a bell or other indicating-signal at the receiving-station and another circuit connecting them, and two switches at the receiving-station for said bell-circuit, one of which is operated by a motor mechanism and the other by an electro-magnetic device controlled by the main circuit.

3. In an electric signal system, a series of signal-boxes and a signal-receiving instrument and a main electric circuit connecting them, ground branch wires at the boxes and switches for closing them at will, a ground branch wire at the receiving-station, and two normally-open switches for said branch wire, one of which is controlled by a motor mechanism and the other by a polarized electro-magnet governed by the main circuit.

4. In an electric signal system, a series of signal-boxes and a relay, as $a^2$, and a main electric circuit connecting them, circuit-changing devices contained in the boxes, a relay, as $e^4$, and another circuit connecting them, a local circuit $d$, controlled by the armature of the relay $a^2$ and also the armature of the relay $e^4$, and a recording-instrument or equivalent controlled by said local circuit, substantially as described.

In testimony whereof I have signed my name to this specification in the presence of two subscribing witnesses.

HOWARD F. EATON.

Witnesses:
BERNICE J. NOYES,
EDWARD F. ALLEN.